United States Patent Office 2,946,227
Patented July 26, 1960

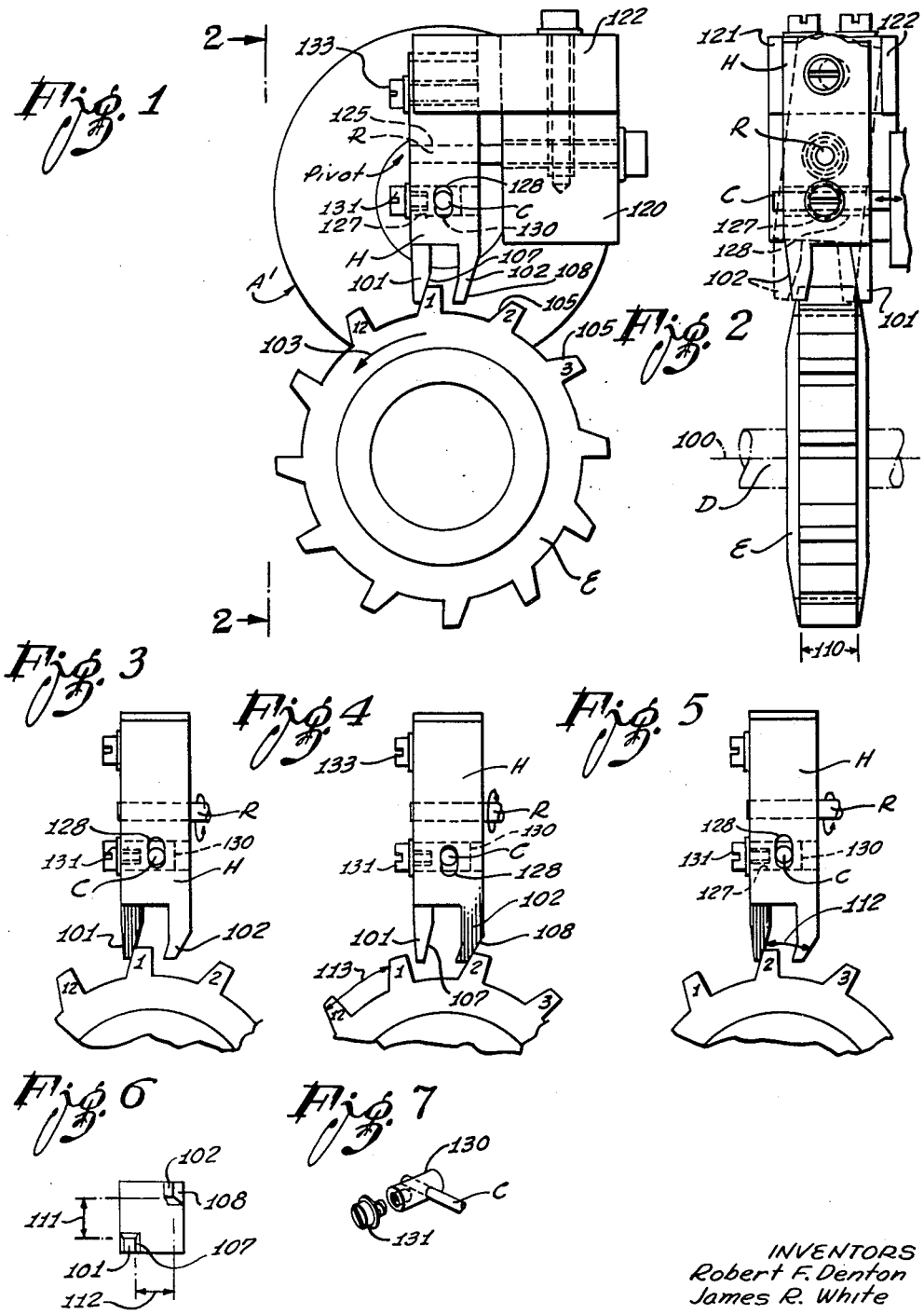

2,946,227

ESCAPEMENT MECHANISM

Robert F. Denton, Los Angeles, and James R. White, Reseda, Calif., assignors to Jamieson Laboratories, Inc., a corporation of California Filed June 24, 1959, Ser. No. 822,642

1 Claim. (Cl. 74—1.5)

The present invention relates to an escapement mechanism for controlling rotary motion of a shaft or other rotary body.

One object of the invention is to provide an escapement mechanism having very few component parts, and which is very inexpensive both to manufacture and to maintain.

Another object of the invention is to provide an escapement mechanism which is reliable in operation under conditions of severe shock and vibration.

A further object of the invention is to provide an escapement mechanism for controlling the rotation of a rotatable member in response to the reciprocation of a reciprocally movable member.

The above and other objects of the invention will be more clearly understood from the following description considered in conjunction with the accompanying drawing illustrating a preferred form of the invention. In the drawing:

Figure 1 is a front elevational view of the toothed escapement wheel of the invention, showing a pivotally movable pawl in operative position adjacent the wheel periphery;

Figure 2 is a side elevational view of the invention taken on the line 2—2 of Figure 1;

Figures 3, 4 and 5 illustrate successive relative positions of the pawl and wheel as the wheel rotates;

Figure 6 is an end view of the pawl showing the spacing of the pawl teeth; and

Figure 7 is a perspective view of the coupling arrangement for driving the pawl.

According to the invention a toothed wheel E is adapted to rotate about its axis 100, supported as by a shaft D. A pawl H is positioned adjacent the wheel periphery and is adapted for pivotal movement so that its near end reciprocates along a path substantially parallel to the wheel axis for controlling the wheel rotation. The pawl is provided on its near end with a pair of teeth 101, 102 which are spaced apart circumferentially of the wheel E, and which are inserted alternately into the path of motion of the wheel teeth as the pawl moves pivotally back and forth.

In the drawing pawl H is illustrated as an elongated member extending substantially perpendicularly upward from the periphery of wheel E. Pawl H is pivotally supported by a shaft R at a substantial distance from the pawl teeth 101, 102, the shaft R being disposed with its longitudinal axis exactly perpendicular to the axis of wheel E. A movable member C is adapted for reciprocal movement along an axis parallel to the wheel axis, and is pivotally coupled to pawl H intermediate the shaft R and teeth 101, 102 for producing a pivotal motion of pawl H about the axis of shaft R.

Thus in the presently illustrated form of the invention the pawl teeth 101, 102 move back and forth across the path of motion of the wheel teeth, along an arc which is substantially parallel to the wheel axis. It will be readily appreciated that the movable member C may, if desired, be itself utilized as the pawl so that the pawl teeth 101, 102 reciprocate along a straight line exactly parallel to the axis of wheel E.

Wheel E is adapted for counterclockwise rotation as viewed in Figure 1, as is indicated by an arrow 103. The various wheel teeth are numbered 1, 2, 3 . . . 12, in a clockwise sequence around the periphery of the wheel, the numbering sequence being selected to coincide with the sequence in which the wheel teeth pass under the lower end of pawl H.

Pawl teeth 101, 102 are spaced apart from each other both in a direction parallel to the wheel axis, and in a direction perpendicular thereto, as may best be seen in Figure 6. As viewed in Figure 1 pawl tooth 101 is at the left and pawl tooth 102 is at the right, the pawl teeth being inserted into the path of motion of the wheel teeth from above wheel E. Since wheel E rotates counterclockwise each of the wheel teeth engages first pawl tooth 102, and subsequently pawl tooth 101. Each wheel tooth has a sloped forward surface 105 adapted to engage the pawl teeth. Forward surfaces 105 are not aligned radially with respect to wheel E, but slope back with increasing distance from the wheel axis, at an angle of about 30 degrees in a clockwise direction. Pawl teeth 101, 102 are respectively provided with sloped surfaces 107, 108 for engaging the forward surfaces 105 of the wheel teeth. Surfaces 107, 108 are not quite parallel to each other because they engage the wheel teeth at different rotational positions.

The length of the wheel teeth measured parallel to the wheel axis is designated by the numeral 110 (see Figure 2), and the spacing between pawl teeth 101, 102 measured in the same direction is designated by numeral 111 (see Figure 6). Distance 111 is substantially less than distance 110. Therefore, when the lower end of pawl H occupies a symmetrical position with respect to wheel E both of the pawl teeth 101 and 102 are interposed in the path of motion of the wheel teeth. Movement of the pawl in one direction brings pawl tooth 101 out of the path of the wheel teeth while pawl tooth 102 remains therein. Movement of pawl H in the other direction removes pawl tooth 102 from the path of motion of the wheel tooth, with pawl tooth 101 remaining therein.

The spacing between operative surface 107 of pawl tooth 101 and operative surface 108 of pawl tooth 102, measured circumferentially of wheel E, is designated by a numeral 112 (see Figure 5). The distance between the forward surfaces 105 of two adjacent wheel teeth, measured circumferentially of wheel E, is designated by the numeral 113 (see Figure 4). The distance values are selected so that distance 112 is exactly half as great as distance 113. Thus the leading edge surfaces of the pawl teeth, which engage the forward surfaces of the wheel teeth, are spaced apart circumferentially of the wheel by one-half the circumferential spacing between the forward surfaces of adjacent wheel teeth.

The operation of the invention is as follows. Wheel E is biased for counterclockwise rotation, by means not shown. It may be assumed that pawl tooth 101 initially engages wheel tooth number 1 (see Figure 3). Pawl tooth 102 then projects into the space between wheel teeth 1 and 2, and is therefore interposed in the path of wheel tooth 2. It is further assumed that the position of pawl H is symmetrical with respect to wheel E, or on dead center. When movable member C (and consequently the pawl teeth) moves to the right (as shown by solid lines in Figure 2), pawl tooth 101 moves out of the path of the wheel teeth. The result is that wheel E rotates by a distance corresponding to one-half of its tooth spacing. After rotating by this amount the wheel is brought to a stop as the result of the engagement of wheel tooth 2 with pawl tooth 102 (see Figure 4).

When movable member C (and consequently the pawl teeth) move to the left as viewed in Figure 2 toward the dotted line position, the result is first that pawl tooth 101 is again interposed in the path of motion of the wheel teeth, and thereafter that pawl tooth 102 is removed from the path of motion of the wheel teeth. The wheel therefore rotates another one-half tooth space and assumes the position shown in Figure 5.

According to the presently illustrated form of the invention the wheel E moves a half tooth space for each movement of member C in one direction, and also for each movement of member C in the other direction. If it is merely desired to have the wheel E rotate by one tooth space for each complete reciprocation of member C, it is then unnecessary for the distance 112 to be exactly one-half the distance 113. It is still necessary, however, for the spacing between the pawl teeth measured circumferentially of wheel E to be at least the thickness of a wheel tooth.

In order for the invention to operate it is necessary that the two pawl teeth be at least partially out of alignment with each other along the path of motion of the wheel teeth. This makes it possible for one of the pawl teeth to be removed from the path of motion of the wheel teeth, while the other pawl tooth remains interposed therein, with the result that the wheel rotates from a position in which its rotation was inhibited by the removed tooth to a position in which its further rotation is then inhibited by the still remaining tooth.

Shaft R is supported from a member 120, which also rigidly supports a parallel pair of plates 121, 122 which project outward on either side of the upper end of pawl H. When pawl H is pivoted to the extent that either of the pawl teeth 101, 102 is removed from the path of motion of the wheel teeth, further pivotal movement of pawl H is inhibited by the fact that the upper end of the pawl engages the corresponding one of projecting side plates 121, 122. Thus the lower end of pawl H, which carries pawl teeth 101, 102, moves between two limit positions.

In the preceding description it has been mentioned that movable member C is pivotally coupled to pawl H intermediate the shaft R and teeth 101, 102 for producing a pivotal motion of pawl H about the axis of shaft R. Details of this arrangement will now be described.

Shaft R is seated in a bore 125 formed in pawl H. A bore 127 is also formed in pawl H, parallel to bore 125 but nearer to pawl teeth 101, 102. An elliptical passageway 128 extends through pawl H perpendicular to bore 127, and hence parallel to the axis of wheel E. Passageway 128 has its major axis aligned radially of wheel E, and is positioned so as to fully intersect with bore 127.

A cylindrical pivot pin 130 occupies bore 127. Member C, being of smaller diameter than pin 130, extends through a suitable transverse bore provided therein (see Figure 7). Reciprocation of member C causes pin 130 to pivot within bore 127, while member C also pivots within passageway 128, about the axis of bore 127.

At the upper end of pawl H a bolt 133 is attached, which is utilized as a counterweight in the particular form of the invention illustrated herein.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

We claim:

An escapement mechanism comprising: a wheel adapted to be rotatably driven in a particular direction about its longitudinal axis and having provided thereon a plurality of longitudinally extending teeth with a uniform circumferential spacing between the forward surfaces of each two adjacent ones thereof; a pawl comprising an elongated member extending substantially radially outward from the periphery of said wheel, supported for pivotal movement about an axis which lies a substantial distance from the periphery of said wheel at a right angle to the axis of said wheel, and having a spaced pair of teeth on its inner end which project toward said wheel so as to selectively engage said forward surfaces of said wheel teeth, said pawl teeth being in staggered relationship both with respect to said wheel axis and said pawl axis, the distance between the operative surfaces of said pawl teeth measured circumferentially of said wheel being one-half the distance between the forward surfaces of adjacent wheel teeth, said operative surfaces of said pawl teeth not being parallel to each other but bearing the same angular relationship with respect to corresponding radii of said wheel, the distance between said pawl teeth measured parallel to said pawl axis being less than the length of said wheel teeth; and independent means for rocking said pawl back and forth between predetermined limit positions so that first one and then the other of said pawl teeth is interposed in the path of motion of said wheel teeth.

References Cited in the file of this patent

FOREIGN PATENTS

| | | |
|---|---|---|
| 498,120 | France | Oct. 7, 1919 |